(12) United States Patent
Dowdy et al.

(10) Patent No.: US 11,827,073 B2
(45) Date of Patent: Nov. 28, 2023

(54) FOUR BAR LINKAGE AND AIR SPRING SUSPENSION SYSTEM

(71) Applicant: Oshkosh Corporation, Oshkosh, WI (US)

(72) Inventors: Austin Dowdy, Oshkosh, WI (US); Paul Dumitru, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/551,782

(22) Filed: Dec. 15, 2021

(65) Prior Publication Data
US 2022/0194153 A1 Jun. 23, 2022

Related U.S. Application Data

(60) Provisional application No. 63/128,431, filed on Dec. 21, 2020.

(51) Int. Cl.
*B60G 21/05* (2006.01)
*B60G 9/02* (2006.01)

(52) U.S. Cl.
CPC .............. *B60G 9/02* (2013.01); *B60G 21/051* (2013.01); *B60G 2200/21* (2013.01); *B60G 2200/314* (2013.01); *B60G 2200/34* (2013.01); *B60G 2202/1524* (2013.01)

(58) Field of Classification Search
CPC ............ B60G 21/055; B60G 2202/152; B60G 2200/314; B60G 21/052; B60G 21/051; B60G 9/02
See application file for complete search history.

(56) References Cited

U.S. PATENT DOCUMENTS

| | | | | |
|---|---|---|---|---|
| 5,785,345 A | * | 7/1998 | Barlas | B62D 61/12 280/124.157 |
| 6,293,570 B1 | * | 9/2001 | Gottschalk | B62D 7/144 280/86.751 |
| 6,510,917 B2 | * | 1/2003 | Cole | B62D 5/0418 180/436 |
| 6,619,673 B2 | * | 9/2003 | Eckelberry | B60G 17/005 180/290 |

(Continued)

FOREIGN PATENT DOCUMENTS

DE 102015003876 A1 * 9/2016
FR 2698825 A1 * 6/1994 ........... B60G 21/051

*Primary Examiner* — Paul N Dickson
*Assistant Examiner* — Maxwell L Meshaka
(74) *Attorney, Agent, or Firm* — Foley & Lardner LLP

(57) ABSTRACT

A suspension assembly for a commercial vehicle includes a first linkage, an air spring, a carriage, and a second linkage. The first linkage is pivotally coupled at a first end with a structural member of a frame. The structural member extends downwards from the frame. The air spring is coupled with the frame and a second end of the first linkage. The air spring drives the first linkage to pivot about the first end relative to the structural member. The carriage is pivotally coupled with the first linkage at a position between the first end and the second end of the first linkage. The second linkage is pivotally coupled at a first end with the structural member, and pivotally coupled with the carriage at a second end. The structural member, the first linkage, the second linkage, and the carriage define a four-bar linkage.

20 Claims, 12 Drawing Sheets

(56) References Cited

U.S. PATENT DOCUMENTS

| | | | | |
|---|---|---|---|---|
| 7,464,948 B2* | 12/2008 | Ramsey | | B60G 7/001 280/124.157 |
| 7,731,211 B2* | 6/2010 | Ramsey | | B60G 21/051 280/124.157 |
| 7,789,405 B2* | 9/2010 | Lie | | B60G 9/00 267/293 |
| 7,938,415 B2* | 5/2011 | Carlson | | B60G 9/02 280/124.11 |
| 8,403,346 B2* | 3/2013 | Chalin | | B60G 9/00 280/5.514 |
| 8,522,933 B2* | 9/2013 | Chalin | | B60G 9/00 188/266 |
| 8,544,864 B2* | 10/2013 | Molitor | | B60G 7/001 280/124.153 |
| 8,695,998 B1* | 4/2014 | Karel | | B60G 7/02 280/86.5 |
| 8,915,507 B2* | 12/2014 | Helm | | B60G 9/022 280/124.157 |
| 9,096,108 B2* | 8/2015 | Aalderink | | B60G 9/003 |
| 9,174,686 B1 | 11/2015 | Messina et al. | | |
| 9,422,014 B1* | 8/2016 | Schuck | | B60G 5/00 |
| 9,707,869 B1 | 7/2017 | Messina et al. | | |
| 10,160,278 B2* | 12/2018 | Coombs | | B60G 5/00 |
| 10,870,325 B2* | 12/2020 | Coombs | | B60G 17/052 |
| 11,117,433 B2* | 9/2021 | Johnson | | B60G 7/02 |
| 11,135,887 B2* | 10/2021 | Aldrich | | B62D 24/04 |
| 11,207,934 B2* | 12/2021 | Schutt | | B60G 7/008 |
| 11,220,149 B2* | 1/2022 | Feriani | | B60B 35/008 |
| 11,345,208 B2* | 5/2022 | Häfele | | B60B 3/14 |
| 11,396,213 B1* | 7/2022 | Hamm | | B60G 21/055 |
| 2002/0130479 A1* | 9/2002 | Eckelberry | | B60G 9/00 280/124.109 |
| 2002/0140198 A1* | 10/2002 | Cole | | B62D 5/0418 280/93.51 |
| 2003/0160416 A1* | 8/2003 | Leen | | B60G 21/055 180/352 |
| 2004/0188973 A1* | 9/2004 | Molitor | | B60G 21/051 280/124.166 |
| 2005/0057014 A1* | 3/2005 | Ramsey | | B60G 21/051 280/124.116 |
| 2005/0062251 A1* | 3/2005 | Ramsey | | B60G 21/051 280/124.153 |
| 2006/0157309 A1* | 7/2006 | Chalin | | B60G 11/28 188/266 |
| 2006/0244234 A1* | 11/2006 | Ramsey | | B60G 21/051 280/124.157 |
| 2006/0249923 A1* | 11/2006 | Ramsey | | B60G 5/047 280/124.157 |
| 2007/0170685 A1* | 7/2007 | Chalin | | B60G 11/28 280/124.157 |
| 2009/0224501 A1* | 9/2009 | Carlson | | B60G 9/02 280/124.1 |
| 2010/0007110 A1* | 1/2010 | Lie | | B60G 21/05 280/124.111 |
| 2011/0175316 A1* | 7/2011 | English | | B60G 9/00 280/124.116 |
| 2014/0197614 A1* | 7/2014 | Aalderink | | B60G 11/27 280/124.116 |
| 2014/0306416 A1* | 10/2014 | Helm | | B60G 9/022 280/124.116 |
| 2019/0248201 A1* | 8/2019 | Johnson | | B60G 11/27 |
| 2019/0329622 A1* | 10/2019 | Coombs | | B60G 17/005 |
| 2020/0122536 A1* | 4/2020 | Aldrich | | B62D 24/04 |
| 2020/0156427 A1* | 5/2020 | Schutt | | B60G 7/008 |
| 2020/0282792 A1* | 9/2020 | Häfele | | B60G 11/27 |
| 2020/0317014 A1* | 10/2020 | Feriani | | B60B 35/14 |
| 2022/0194153 A1 | 6/2022 | Dowdy et al. | | |
| 2022/0212509 A1* | 7/2022 | Hamm | | B60G 9/022 |
| 2023/0018844 A1* | 1/2023 | Henry | | B60G 5/02 |

\* cited by examiner

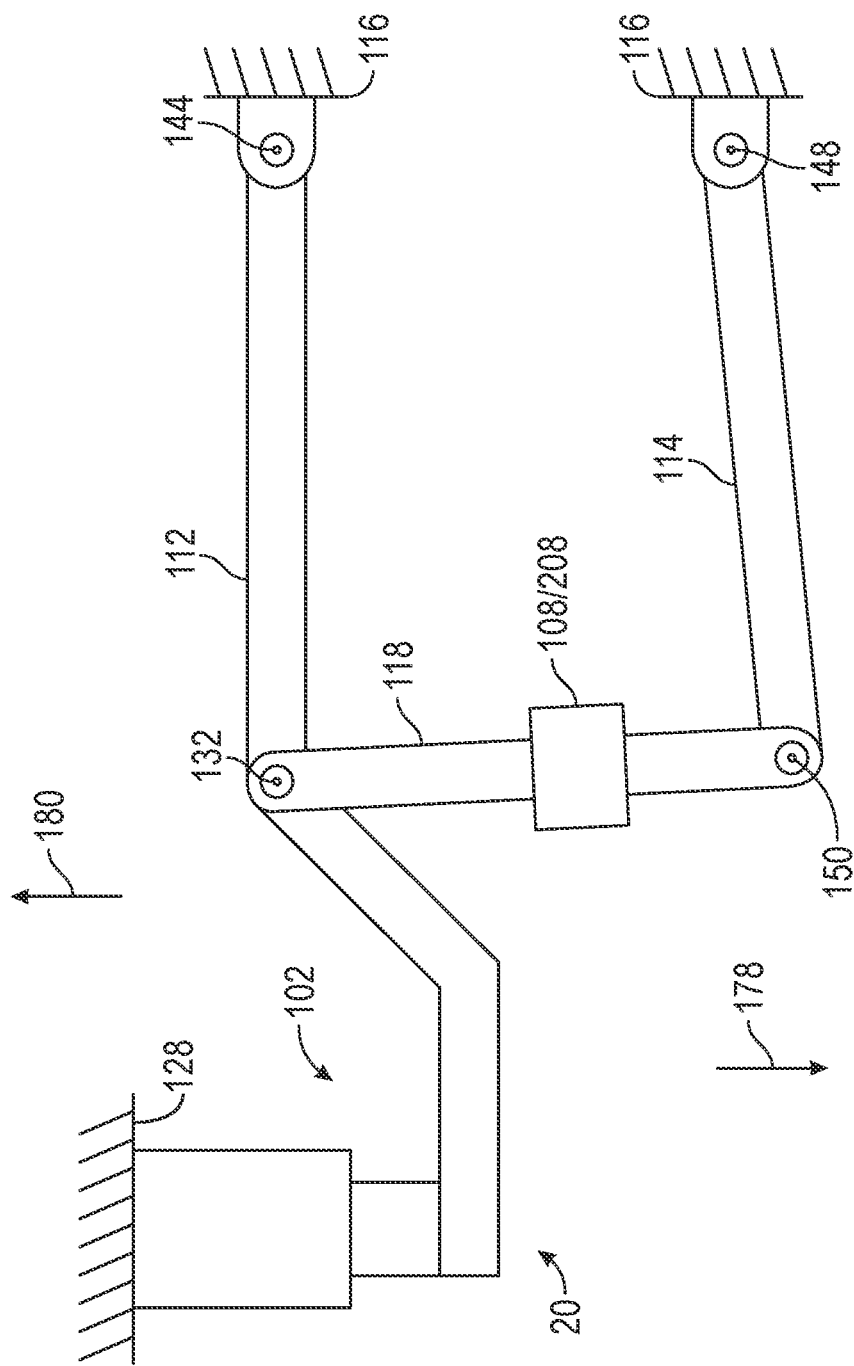

FOUR BAR LINKAGE AND AIR SPRING SUSPENSION SYSTEM

CROSS-REFERENCE TO RELATED PATENT APPLICATION

This application claims the benefit of and priority to U.S. Provisional Application No. 63/128,431, filed Dec. 21, 2020, the disclosure of which is incorporated by reference herein in its entirety.

BACKGROUND

The present disclosure relates to suspension systems. More particularly, the present disclosure relates to airbag suspension systems.

SUMMARY

One embodiment of the present disclosure is a commercial vehicle. The commercial vehicle includes a frame, an axle, and a suspension assembly. The frame extends in a longitudinal direction of the commercial vehicle and includes a pair of rails spaced laterally apart. The suspension assembly is coupled with the frame. The suspension assembly includes a pair of first linkages, a pair of air springs, a pair of carriages, and a pair of second linkages. The pair of first linkages are pivotally coupled at their first ends with a pair of structural members of the frame. The structural members extend in a downwards direction from the rails of the frame. The pair of air springs are coupled with the frame and coupled with a second end of the first linkages. The air springs are configured to extend and retract to drive the first linkages to pivot about their first ends relative to the structural members. The pair of carriages are pivotally coupled with the first linkages at a position between the first end and the second end of the first linkages. The axle is fixedly coupled with the carriages. The pair of second linkages are pivotally coupled at their first ends with the structural member, and pivotally coupled with the carriages at their second ends. The pair of structural members, the pair of first linkages, the pair of second linkages, and the pair of carriages define a pair of four-bar linkages.

Another embodiment of the present disclosure is a suspension assembly for a commercial vehicle. The suspension assembly includes a first linkage, an air spring, a carriage, and a second linkage. The first linkage is pivotally coupled at a first end with a structural member of a frame of the commercial vehicle. The structural member extends in a downwards direction from the frame. The air spring is coupled with the frame and coupled with a second end of the first linkage. The air spring is configured to extend and retract to drive the first linkage to pivot about the first end relative to the structural member. The carriage is pivotally coupled with the first linkage at a position between the first end and the second end of the first linkage. The axle is fixedly coupled with the carriage. The second linkage is pivotally coupled at a first end with the structural member, and pivotally coupled with the carriage at a second end. The structural member, the first linkage, the second linkage, and the carriage define a four-bar linkage.

Another embodiment of the present disclosure is a chassis for a commercial vehicle. The chassis includes an axle, and a suspension assembly coupled with a frame of the commercial vehicle. The suspension assembly includes a pair of first linkages, a pair of air springs, a pair of carriages, and a pair of second linkages. The pair of first linkages are pivotally coupled at their first ends with a pair of structural members of the frame, the structural members extending in a downwards direction from the rails of the frame. The pair of air springs are coupled with the frame and coupled with a second end of the first linkages. The air springs are configured to extend and retract to drive the first linkages to pivot about their first ends relative to the structural members. The pair of carriages are pivotally coupled with the first linkages at a position between the first end and the second end of the first linkages, the axle is fixedly coupled with the carriages. The pair of second linkages are pivotally coupled at their first ends with the structural member, and pivotally coupled with the carriages at their second ends. The pair of structural members, the pair of first linkages, the pair of second linkages, and the pair of carriages define a pair of four-bar linkages.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 12 is a diagram of one of the four-bar linkages of the suspension assemblies of FIGS. 1-11, according to an exemplary embodiment.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a suspension system for a commercial vehicle includes a pair of four-bar linkages. The four-bar linkages can be mirror images of each other, or may be symmetric. The four-bar linkages are positioned on opposite lateral sides of a frame of the commercial vehicle. The four-bar linkages are configured to cooperatively drive an axle to adjust a ride height of the commercial vehicle. The four-bar linkages are driven by extension or retraction of a pair of air springs.

Commercial Vehicle

Figure 1:
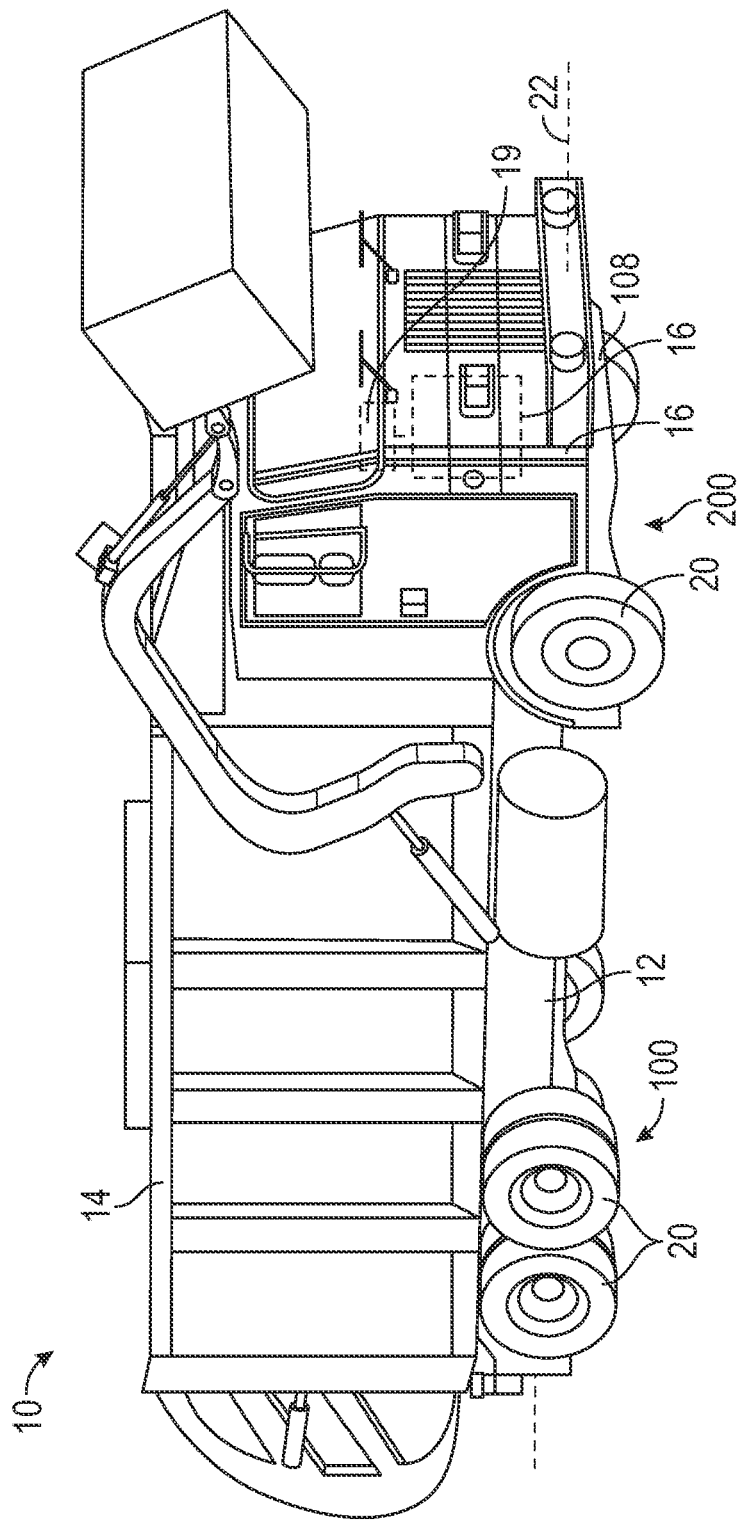
FIG. 1 is a schematic diagram of a commercial vehicle including a frame and multiple suspension assemblies, according to an exemplary embodiment.

According to the exemplary embodiment shown in FIG. 1, a vehicle, shown as commercial vehicle 10 (e.g., a garbage truck, a refuse vehicle, a semi-truck, a fire truck, a waste collection truck, a sanitation truck, a skid-loader, a telehandler, a plow truck, a boom lift, etc.) includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the commercial vehicle 10 by an operator (e.g., a seat, a steering wheel, hydraulic controls, a user interface, an acceleration pedal, a brake pedal, a clutch pedal, a gear selector, switches, buttons, dials, etc.). As shown in FIG. 1, the commercial vehicle 10 includes a prime mover, shown as engine 18, coupled to the frame 12 at a position beneath the cab 16. The engine 18 is configured to provide power to tractive elements, shown as wheels 20, and/or to other systems of the commercial vehicle 10 (e.g., a pneumatic system, a hydraulic system, etc.). The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the commercial vehicle 10. The frame 12 may define a longitudinal axis 22 of the commercial vehicle 10.

Figure 2:
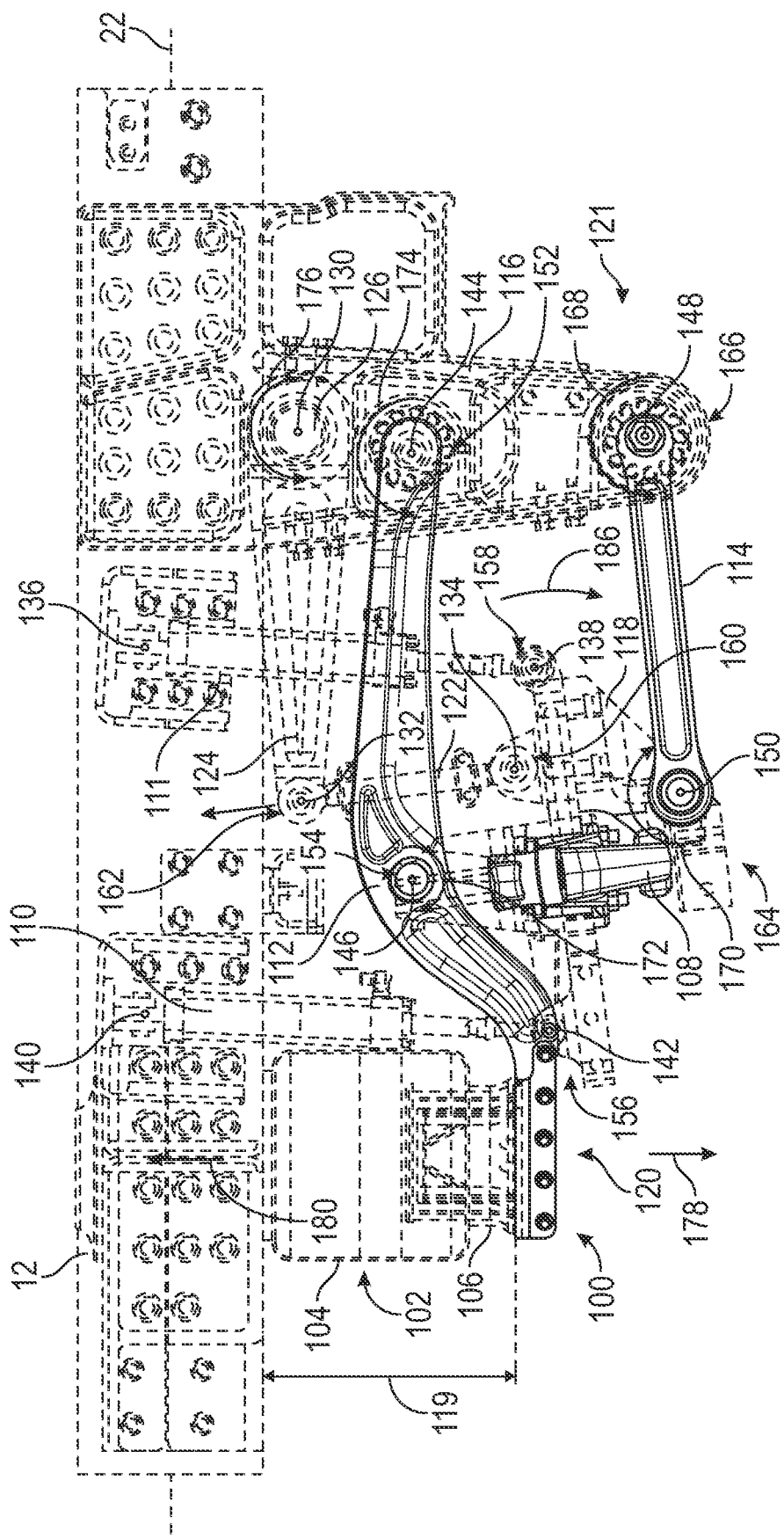
FIG. 2 is a side view of one of the suspension assemblies of the commercial vehicle of FIG. 1, showing one of two four-bar linkages, according to an exemplary embodiment.

Still referring to FIGS. 1-2, the commercial vehicle 10 is shown to include an engine control module, shown as engine control unit (ECU) 19, according to an exemplary embodiment. ECU 19 is configured to communicably connect with engine 18 and to control operations of engine 18. In some embodiments, ECU 19 communicably connects with sensors of engine 18 and controls operations of actuators of engine 18. The sensors which ECU 19 communicably connects with may be at least one of an air flow sensor, a mass airflow sensor, a pressure sensor, a temperature sensor, an engine speed sensor, an exhaust oxygen sensor, a throttle position sensor, a coolant temperature sensor, a manifold absolute pressure sensor, a crankshaft sensor, a camshaft sensor, or any other sensors relevant to the operation of engine 18. ECU 19 may receive the information from at least one of the sensors and may determine an adjustment of operation of engine 18. ECU 19 may include a processing circuit and memory configured to receive the information from the sensors through a communications interface and may use any of a lookup table, a graph, an equation, a set of rules, a set of conditions, etc., stored in the memory of ECU 19 to determine the operational adjustment of engine 18. ECU 19 may be configured to implement the operational adjustment of engine 18 by transmitting signals to controllers configured to adjust an operation of at least one of a fuel injection quantity, a timing angle, an air to fuel ratio of fuel injected, an idle speed, engine valves, etc., of engine 18.

Referring still to FIG. 1, the commercial vehicle 10 includes a front suspension assembly 100 and a rear suspension assembly 200. The front suspension assembly 100 and the rear suspension assembly 200 can include a four-bar linkage and air springs for selectively adjusting a ride height of the commercial vehicle 10 or to selectively adjust a relative distance between a front axle 108 of the commercial vehicle 10 and the frame 12.

Front Four Bar Linkage Suspension Assembly

Referring now to FIGS. 2-6 and 12, the front suspension assembly 100 is shown to include a first linkage 112 (e.g., a bar, a beam, a structural member, an elongated member, etc.), and a second linkage 114 (e.g., a bar a beam, a structural member, an elongated member, etc.). The front suspension assembly 100 also includes an air spring (e.g., an air bag) 102. The air spring 102 can have an overall length 119 including an outer portion 104 and an inner portion 106 that is configured to be received within the outer portion 104 and translate relative to the outer portion 104 to increase or decrease the overall length 119 of the air spring 102. The air spring 102 can be operated to extend or retract (e.g., to increase in the overall length 119 or to decrease in the overall length 119) to drive the front suspension assembly 100. The air spring 102 can be an air piston or cylinder that is pressurized with air or another gas and can extend or retract to provide damping, resistance, etc.

Referring still to FIGS. 2-6 and 12, the frame 12 may include two members that are substantially parallel with each other and offset in a lateral direction from each other. Particularly, the frame 12 includes a first frame member 12a and a second frame member 12b. The first linkage 112 includes an interfacing portion 120 (e.g., an end portion, a distal portion, a connection portion, a connector, etc.) that is configured to fixedly couple with the air spring 102 (e.g., fixedly couple with the inner portion 106 of the air spring 102).

The frame 12 includes a structural member 116 that protrudes or extends in a downwards direction (e.g., towards a surface upon which the tractive elements 20 rest). The structural member 116 may be a bar, a beam, an extension, an elongated member, etc. The first linkage 112 rotatably or pivotally couples (at a first end of the first linkage 112) with the structural member 116 at a pivotal coupling 152. The front suspension assembly 100 can include a ball joint, or any other pivotal coupling at the pivotal coupling 152. The pivotal coupling 152 may define an axis 144 about which the first linkage 112 can rotate or pivot as the front suspension assembly 100 is operated. The first linkage 112 extends longitudinally from the pivotal coupling 152 to the air spring 102. The air spring 102 is fixedly coupled with the frame 12 at a position longitudinally offset from the structural member 116. Specifically, the outer portion 104 can be fixedly coupled with a lateral cross member 128 that extends between the first frame member 12a and the second frame member 12b. The pivotal coupling 152 may be at a first end of the first linkage 112, while the interfacing portion 120 is at a second or distal end of the first linkage 112.

The second linkage 114 is also pivotally or rotatably coupled with the structural member 116 at a pivotal coupling 166. The pivotal coupling 166 may be positioned at a lower position on the structural member 116 (e.g., at a bottom end of the structural member 116). The pivotal coupling 166 may be the same as or similar to the pivotal coupling 152 (e.g., including a ball joint). The pivotal coupling 166 can define an axis 148 about which the second linkage 114 rotates or pivots as the front suspension assembly 100 is operated (e.g., as the air spring 102 is driven to extend or retract). The pivotal coupling 166 is positioned at a first end of the second linkage 114.

The front suspension assembly 100 also includes a carriage, a frame member, a carrier, an axle support member, a structural member, etc., shown as carriage 118. The carriage 118 is configured to support or fixedly couple with the front axle 108. The carriage 118 is configured to pivotally or rotatably couple with the first linkage 112 at a pivotal coupling 154. The pivotal coupling 154 is positioned between the pivotal coupling 152 (at the first end of the first linkage 112) and the interfacing portion 120 (at the second end of the first linkage 112). The pivotal coupling 154 can include a ball joint or other coupling to facilitate relative rotation between the carriage 118 and the first linkage 112. The pivotal coupling 154 defines an axis 146 about which the carriage 118 can rotate or pivot relative to the first linkage 112. The first linkage 112 may pivotally or rotatably couple with the carriage 118 at an upper portion of the carriage 118.

The second linkage 114 also rotatably or pivotally couples with the carriage 118 at a lower portion (e.g., opposite the upper portion) of carriage 118. The second linkage 114 pivotally or rotatably couples with the carriage 118 through a pivotal coupling 164. The pivotal coupling 164 can also include a ball joint to facilitate relative rotation between the second linkage 114 and the carriage 118. The pivotal coupling 164 may define an axis 150 about which the carriage 118 can rotate or pivot relative to the second linkage 114.

The front suspension assembly 100 also includes a first lockout cylinder 110 and a second lockout cylinder 111. The first lockout cylinder 110 and the second lockout cylinder 111 can be configured to facilitate controlled motion (e.g., controlled rotation, pivoting, translation, or a combination thereof) of the carriage 118 as the front suspension assembly 100 operates (e.g., as the air spring 102 is operated to extend or retract). For example, operations of the front suspension assembly 100 may cause the carriage 118 and thereby the front axle 108 to rotate and/or translate. The first lockout cylinder 110 and the second lockout cylinder 111 can provide damping so that the carriage 118 and the front axle 108 pivot or tilt in a controlled manner, or at a controlled rate (e.g., a sufficiently low rate).

The first lockout cylinder 110 and the second lockout cylinder 111 can be hydraulic pistons, or may be gas-charged cylinders. The first lockout cylinder 110 and the second lockout cylinder 111 may be driven members that are driven to extend or retract, thereby adjusting an inner volume, when the air spring 102 is operated. In other embodiments, the first lockout cylinder 110 and the second lockout cylinder 111 are actively operated (e.g., by pumping hydraulic fluid into the inner volume) to drive the carriage 118 and the front axle 108 to rotate or tilt (e.g., to operate the front suspension assembly 100). The first lockout cylinder 110 and the second lockout cylinder 111 can also function as shock absorbers once the carriage 118 and the front axle 108 are positioned at a desired location. The first lockout cylinder 110 and the second lockout cylinder 111 may be optional for the front suspension assembly 100, and may be implementation-specific. For example, other implementations of the front suspension assembly 100 do not include the first lockout cylinder 110 and the second lockout cylinder 111. In other embodiments, the commercial vehicle 10 only includes one of the first lockout cylinder 110 and the second lockout cylinder 111 per side.

The carriage 118 may function as a third or intermediate linkage of the front suspension assembly 100, according to an exemplary embodiment. A fourth linkage of the front suspension assembly 100 is the frame 12. In this way, the front suspension assembly 100 includes a four-bar linkage 121 formed by the first linkage 112, the second linkage 114, the carriage 118, and a ground linkage (e.g., the frame 12, and other members, portions, etc., of the commercial vehicle 10). For example, as shown in FIG. 12, the first linkage 112, the second linkage 114, the carriage 118, and the ground linkages (e.g., the frame 12) form the four bar linkage 121. The first linkage 112 is driven by the air spring 102 to pivot about the axis 144 in direction 174 relative to the structural member 116, thereby driving the second linkage 114 to pivot about the axis 148 relative to the structural member 116 in direction 168. As the second linkage 114 rotates about the axis 148 in the direction 168, and the first linkage 112 rotates about the axis 144 in the direction 174, the carriage 118 rotates relative to the second linkage 114 in a direction 170 about the axis 150 and also rotates relative to the first linkage 112 in a direction 172 about the axis 146. This results in the carriage 118 tilting or rotating in a direction 186 relative to the frame 12 (when the air spring 102 extends in direction 178).

The first linkage 112 may have an S-shape. For example, as shown in FIG. 2, the pivotal coupling 154 is positioned at a curved portion of the first linkage 112. The first linkage 112 may include two generally straight portions and a curved middle portion (where the pivotal coupling 154 is located). A first straight portion of the first linkage 112 may pivotally couple at a terminating end of the first linkage 112 with the frame 12 (e.g., at the pivotal coupling 152). A second straight portion of the first linkage 112 may provide a surface at which the air spring couples with the first linkage 112. The second linkage 114 can be a straight linkage, bar, beam, etc., that extends between the carriage 118 and the frame 12 (e.g., or, more specifically, the structural member 116) at the pivotal coupling 166.

As the carriage 118 tilts in the direction 186 relative to the frame 12, this may cause the first lockout cylinder 110 to contract or compress (e.g., decrease in overall length) and cause the second lockout cylinder 111 to extend (e.g., increase in overall length). The first lockout cylinder 110 can be rotatably or pivotally coupled with the carriage 118 at a first end at pivotal coupling 156 so that the first lockout cylinder 110 can rotate about an axis 142. The first lockout cylinder 110 is also rotatably or pivotally coupled with the frame 12 at a second end (e.g., an opposite end) so that the first lockout cylinder 110 can rotate about an axis 140.

Similarly, the second lockout cylinder 111 is also rotatably or pivotally coupled with the carriage 118 at a first end so that the second lockout cylinder 111 can rotate or pivot relative to the carriage 118 about axis 138 at a pivotal coupling 158. The second lockout cylinder 111 is also rotatably or pivotally coupled with the carriage 118 at a second end so that the second lockout cylinder 111 can rotate or pivot relative to the frame 12 about axis 136. Extension of the air spring 102 in direction 178 drives rotation of the carriage 118 (e.g., in direction 186) and also drives translation of the carriage 118 in direction 178 (e.g., downwards). Since the front axle 108 is fixedly coupled with the carriage 118, translation and rotation of the carriage 118 results in similar translation and rotation of the front axle 108.

The air spring 102 can also be operated to retract (e.g., to decrease in overall length 119) so that the inner portion 106 translates relative to the outer portion 104 in direction 180. When the air spring 102 operates to retract, the interfacing portion 120 is driven to translate in direction 180 (e.g., towards the frame 12). The first linkage 112 is driven by operation of the air spring 102 to rotate about the axis 144 in a direction opposite the direction 174 relative to the structural member 116. Similarly, the second linkage 114 is driven to rotate relative to the structural member 116 about the axis 148 in a direction opposite the direction 168. The carriage 118, and therefore the front axle 108 are driven to rotate (e.g., through rotation of the first linkage 112 and the second linkage 114) in a direction opposite the direction 186 (e.g., relative to the frame 12). In this way, operation of the air spring 102 to increase in overall length 119 (e.g., to extend) drives the carriage 118 and the front axle 108 to translate downwards, in the direction 178, and rotate in the direction 186, while operation of the air spring 102 to decrease in overall length 119 (e.g., to retract) drives the carriage 118 and the front axle 108 to translate upwards, in the direction 180, and rotate in a direction opposite the direction 186.

Referring still to FIGS. 2-6 and 12, the front suspension assembly 100 includes a pair of linkages 122a and 122b, a torsional member 126 (e.g., a torsional shaft), and a pair of bars 124a and 124b. The bar 124, the pair of linkages 122, and the torsional member 126 may define a sway bar linkage system. The torsional member 126 may provide roll stiffness or roll stability for the commercial vehicle 10. For example, referring particularly to FIG. 3, the front suspension assembly 100 includes two four-bar linkages 121 and the commercial vehicle 10 includes a first frame member 12a and a second frame member 12b. The first frame member 12a and the second frame member 12b both extend in a direction parallel with the longitudinal axis 22. The first four bar linkage 121a is positioned at the first frame member 12a and the second four bar linkage 121b is positioned at the second frame member 12b. The first four bar linkage 121a and the second four bar linkage 121b can be mirrored about the longitudinal axis 22. The first four bar linkage 121a is the four-bar linkage 121a as described in greater detail above with reference to FIG. 2. The second four-bar linkage 121b includes the same components as the first four-bar linkage 121a but in a mirrored configuration. For example, both the first four-bar linkage 121a and the second four-bar linkage 121b include first linkages 112a and 112b, second linkages 114a and 114b, structural members 116a and 116b, and carriages 118a and 118b. The carriages 118a and 118b fixedly couple with the front axle 108 at opposite ends of the front axle 108.

Figure 3:
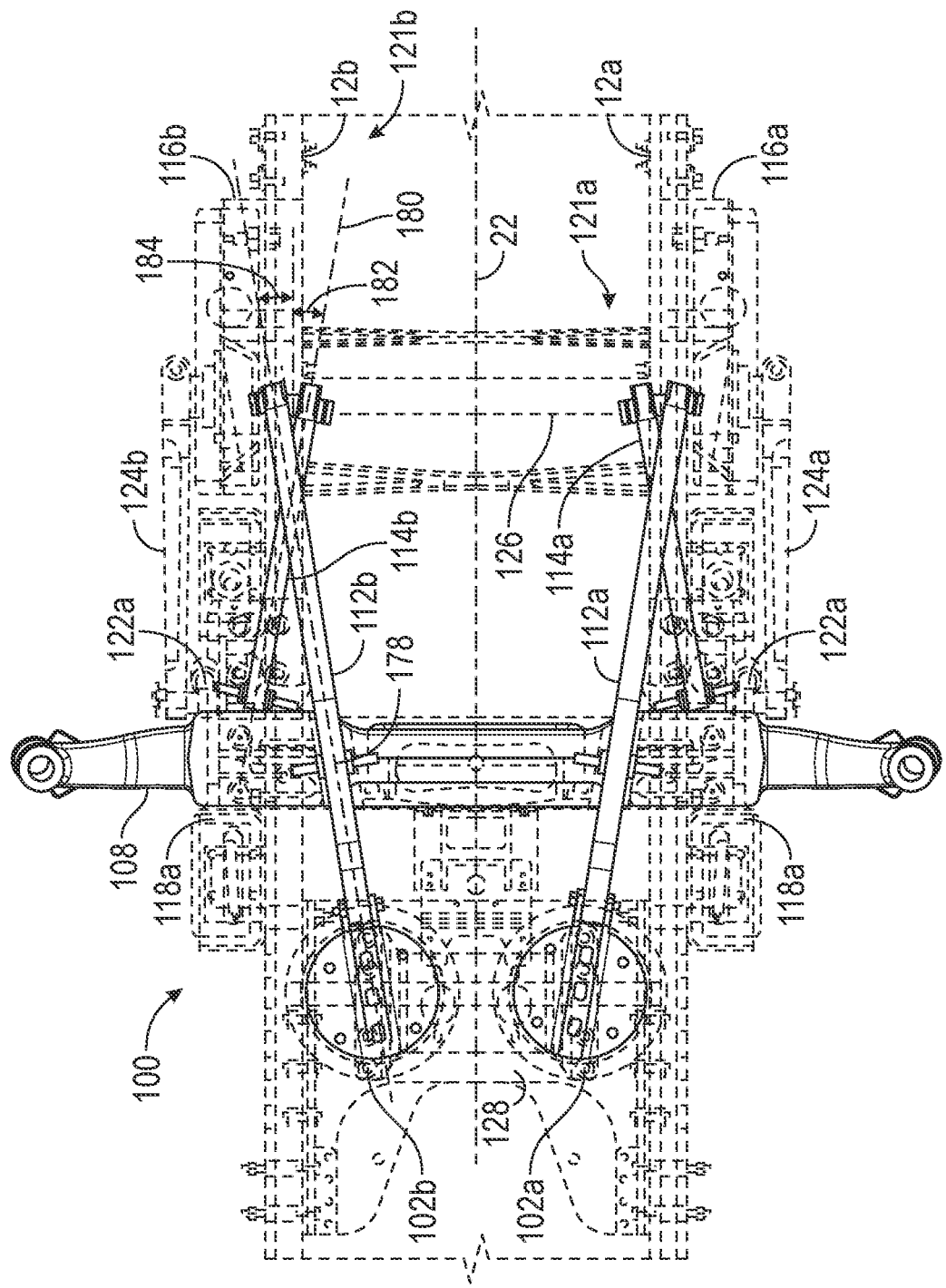
FIG. 3 is a top view of the suspension assembly of the commercial vehicle of FIG. 1, showing both of the two four-bar linkages, according to an exemplary embodiment.
Figure 4:
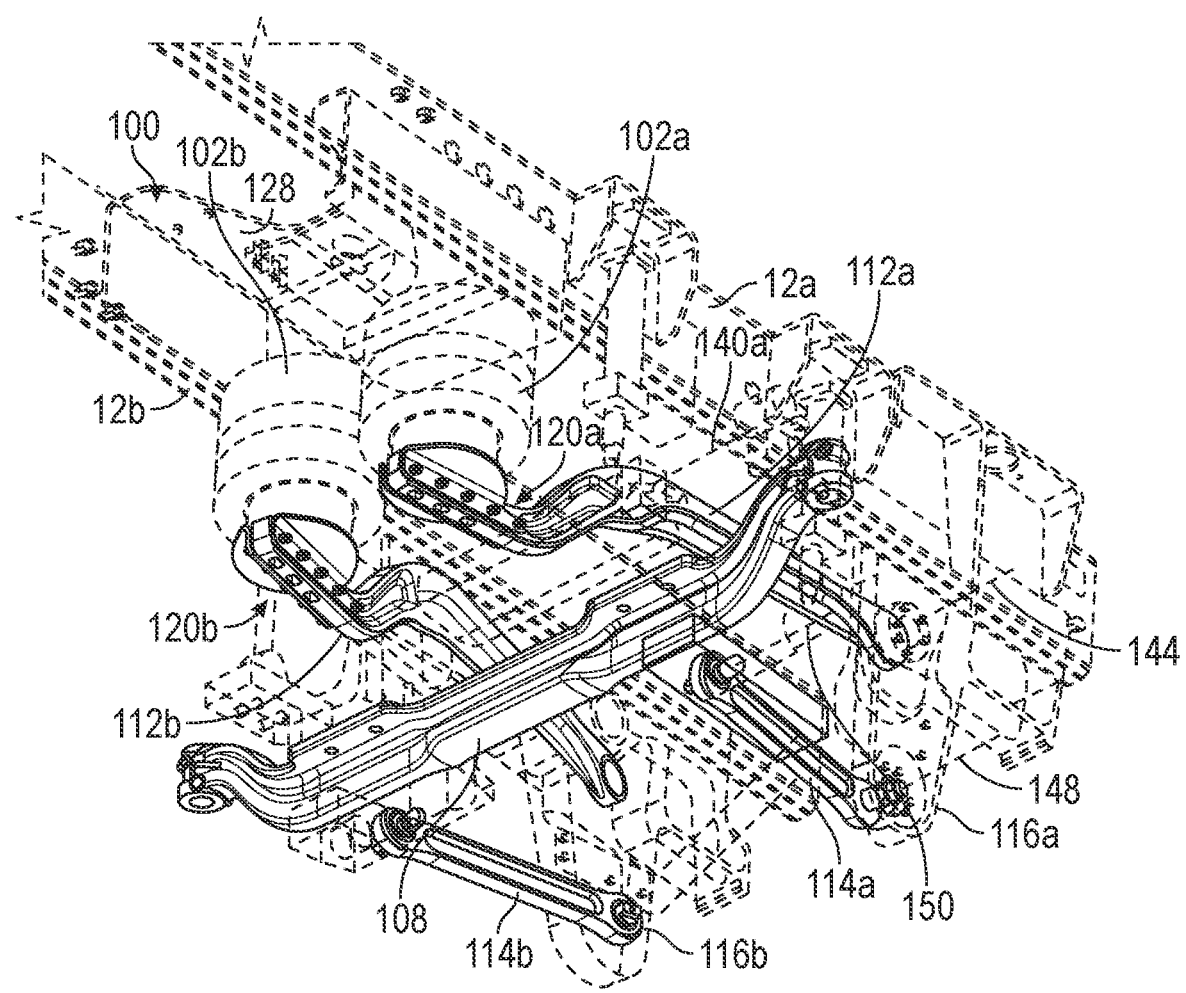
FIG. 4 is a perspective view of the suspension assembly of the commercial vehicle of FIG. 1, showing both of the two four-bar linkages, according to an exemplary embodiment.
Figure 5:
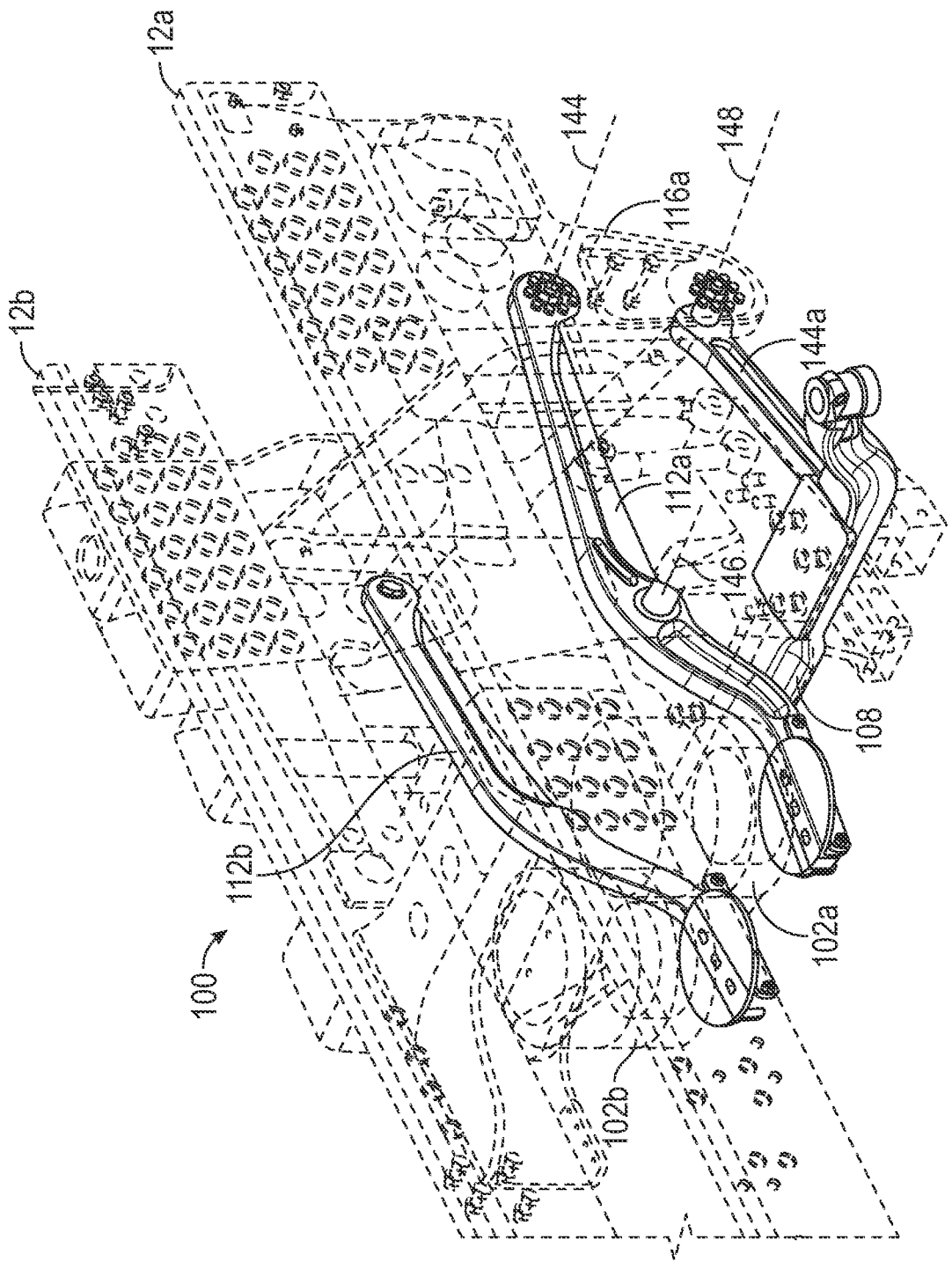
FIG. 5 is a perspective view of the suspension assembly of the commercial vehicle of FIG. 1, showing both of the two four-bar linkages, according to an exemplary embodiment.
Figure 6:
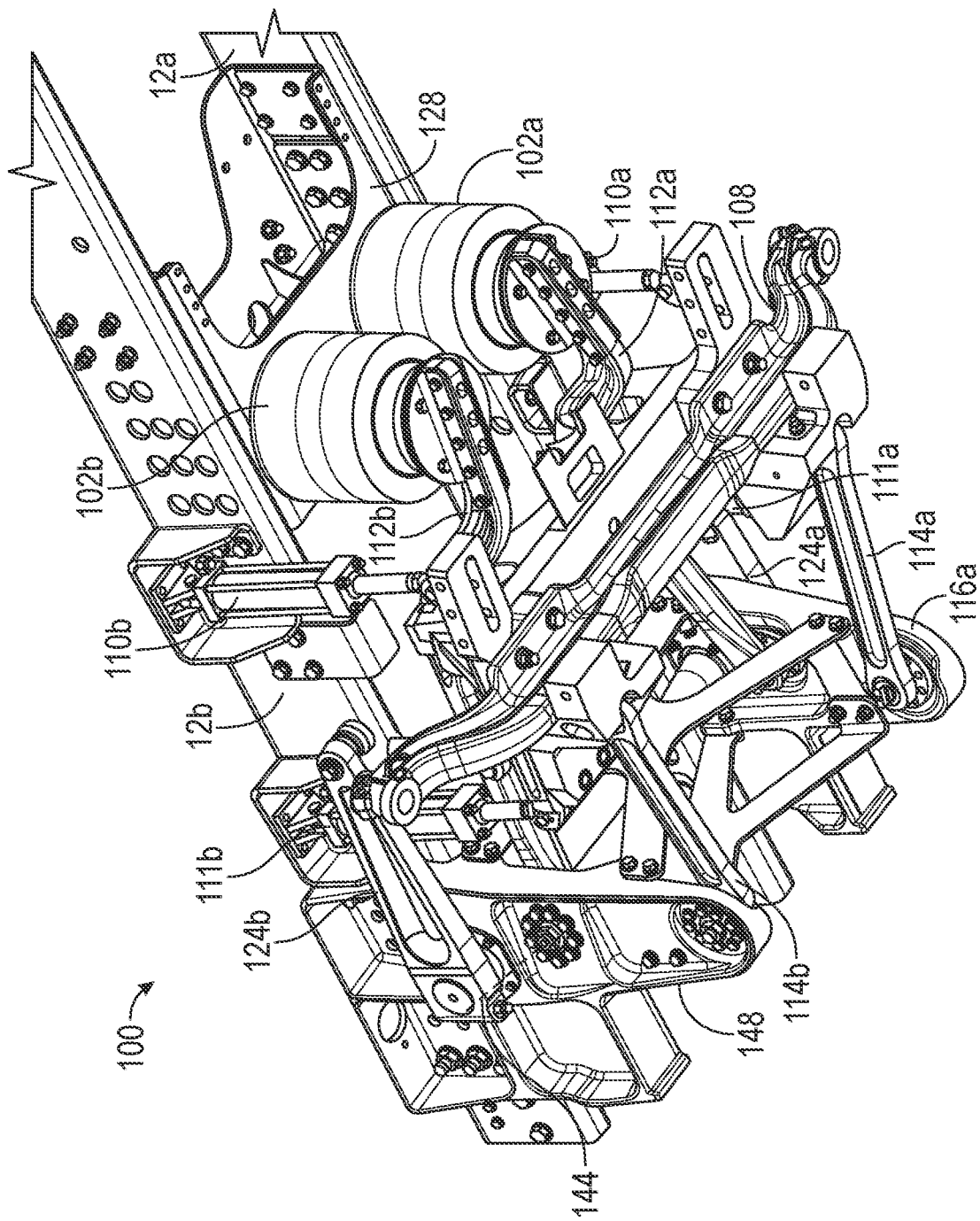
FIG. 6 is a perspective view of the suspension assembly of the commercial vehicle of FIG. 1, showing both of the two four-bar linkages, according to an exemplary embodiment.

Referring still to FIG. 3, the first linkages 112 are shown to extend in a direction that is non-parallel with the longitudinal axis 22. For example, the air springs 102a and 102b are positioned within the frame members 12a and 12b, while the first linkages 112a and 112b extend in a direction outwards, away from the longitudinal axis 22, towards the frame members 12a and 12b. As shown in FIG. 3, the first linkage 112b is angled at an angle 184 (e.g., 45 degrees or less, less than 90 degrees, etc.) relative to the longitudinal axis 22. The first linkage 112a is similarly angled, but in an opposite direction (due to the mirrored configuration). The second linkage 114b is angled in an opposite direction (e.g., inwards, towards the longitudinal axis 22) at an angle 182. The angulation of the first linkages 112a and 112b and the second linkages 114a and 114b reduces, limits, or controls an amount of lateral and/or longitudinal movement of the front axle 108 (e.g., as the front suspension assembly 100 is operated to raise or lower the front axle 108 in a vertical direction). The first linkages 112a and 112b are angled such that the first linkages 112a and 112b become closer together from the axes 144 to the air springs 102a and 102b. Advantageously, the air springs 102a and 102b are positioned laterally closer together than the ends of the first linkages 112a and 112b that are pivotally coupled with the structural members 116. The air springs 102a and 102b can be positioned, at least partially due to the inwards angulation of the first linkages 112a and 112b, between the first frame member 12a and the second frame member 12b.

The first four-bar linkage 121a and the second four-bar linkage 121b can be independently controlled by independent operation of the air springs 102a and 102a. For example, the air spring 102a may be operated to independently drive the first four-bar linkage 121a, while the air spring 102b may be operated to independently drive the second four-bar linkage 121b. The first four-bar linkage 121a and the second four-bar linkage 121b can drive the front axle 108 to translate upwards or downwards or can drive the front axle 108 to rotate or tilt (e.g., about the longitudinal axis 22).

In this way, the first four-bar linkage 121a and the second four-bar linkage 121b are configured to operate in unison to raise and lower the front axle 108 (e.g., to translate the front axle 108 in direction 178 or direction 180) while controlling or limiting lateral and/or longitudinal translation of the front axle 108. The first four-bar linkage 121a and the second four-bar linkage 121b can be designed for use with a commercial truck axle 108.

Referring particularly to FIGS. 2 and 3, the front suspension assembly 100 includes a first bar 124a that is fixedly coupled with the first carriage 118a through a first linkage 122a, a second bar 124b that is fixedly coupled with the second carriage 118b through a second linkage 122b, and the torsional member 126. The linkages 122 (e.g., the first linkage 122a and the second linkage 122b) pivotally couple with the corresponding carriage 118 (e.g., the first linkage 122a pivotally couples with the first carriage 118a, and the second linkage 122b pivotally couples with the second carriage 118b) through a pivotal coupling 160, which defines an axis 134. The linkages 122 also pivotally couple, at an opposite end, with the corresponding bars 124 (e.g., the first linkage 122a pivotally couples with the bar 124a and the second linkage 122b pivotally couples with the bar 124b) through a pivotal coupling 162 which defines an axis 132. The torsional member 126, as shown in FIG. 3, extends between the first frame member 12a and the second frame member 12b. The torsional member 126 is fixedly coupled at opposite ends with the first bar 124a and the second bar 124b, and thereby with the first carriage 118a and the second carriage 118b through the first linkage 122a and the second linkage 122b, respectively. The torsional member 126, the first bar 124a, the second bar 124b, the first linkage 122a, and the second linkage 122b can form a sway-bar assembly that is configured to distribute loads between opposite ends of the front axle 108.

The torsional bar 126 can be loaded in torsion as the front axle 108 experiences loads that cause the front axle 108 to translate, rock, or rotate (e.g., about the longitudinal axis 22). For example, the front axle 108 may support the tractive elements 20 and can experience loads or impacts from terrain that the tractive elements 20 travel along. The front axle 108 can also be driven to translate through operation of the air springs 102. For example, when the carriage 118 translates or moves in the direction 178, the bar 124 (e.g., the first bar 124a) may be driven to rotate relative to the structural member 116 in direction 176, thereby loading the torsional bar 126 in torsion.

Advantageously, the front suspension assembly 100 provides a four-link suspension system for heavy duty solid axles 108. The angled orientation of the first linkages 112 and the second linkages 114 (e.g., angles 182 and 184) provides both lateral and longitudinal location control of the front axle 108. Advantageously, the front suspension assembly 100 also can function as a main suspension spring mount. Spring functionality of the front suspension assembly 100 also produces a high spring motion ratio, thereby facilitating the use of commercial air springs (e.g., air springs 102) for axles having a weight of 30,000 pounds or more. Advantageously, the front suspension assembly 100 provides cost-effective load-based vehicle ride height control. Other systems use fixed rate coil springs to allow adjustment of ride height of the vehicle based on load. However, this is typically undesirable since it can lead to detrimental vehicle dynamic performance. Since the first linkages 112 are angled (e.g., at angle 184), the air springs 102 can be positioned inboard of the frame members 12a and 12b (e.g., frame rails). Advantageously, positioning the air springs 102 inboard of the frame members 12a and 12b facilitates room for high-cramp angle steering. Further, the front suspension assembly 100 facilitates smaller sized air springs 102, thereby reducing costs associated with the front suspension assembly 100.

In some embodiments, the four-bar linkages 121 of the suspension assembly 100 freely cross-articulate, unlike other heavy truck suspension systems (which are typically kinematically over-constrained). Advantageously, the kinematic freedom of the suspension assembly 100 allows for design balance of vehicle roll stiffness (e.g., through torsional stiffness of the torsional member 126) and axle articulation performance (e.g., translation of the front axle 108 in direction 178 or direction 180). Further, since the four-bar linkages 121 (or, more specifically, the first linkages 112 and the second linkages 114 thereof) of the suspension assembly 100 are not loaded torsionally, this can improve a durability of the four-bar linkages 121.

Rear Four Bar Linkage Suspension Assembly

Figure 7:
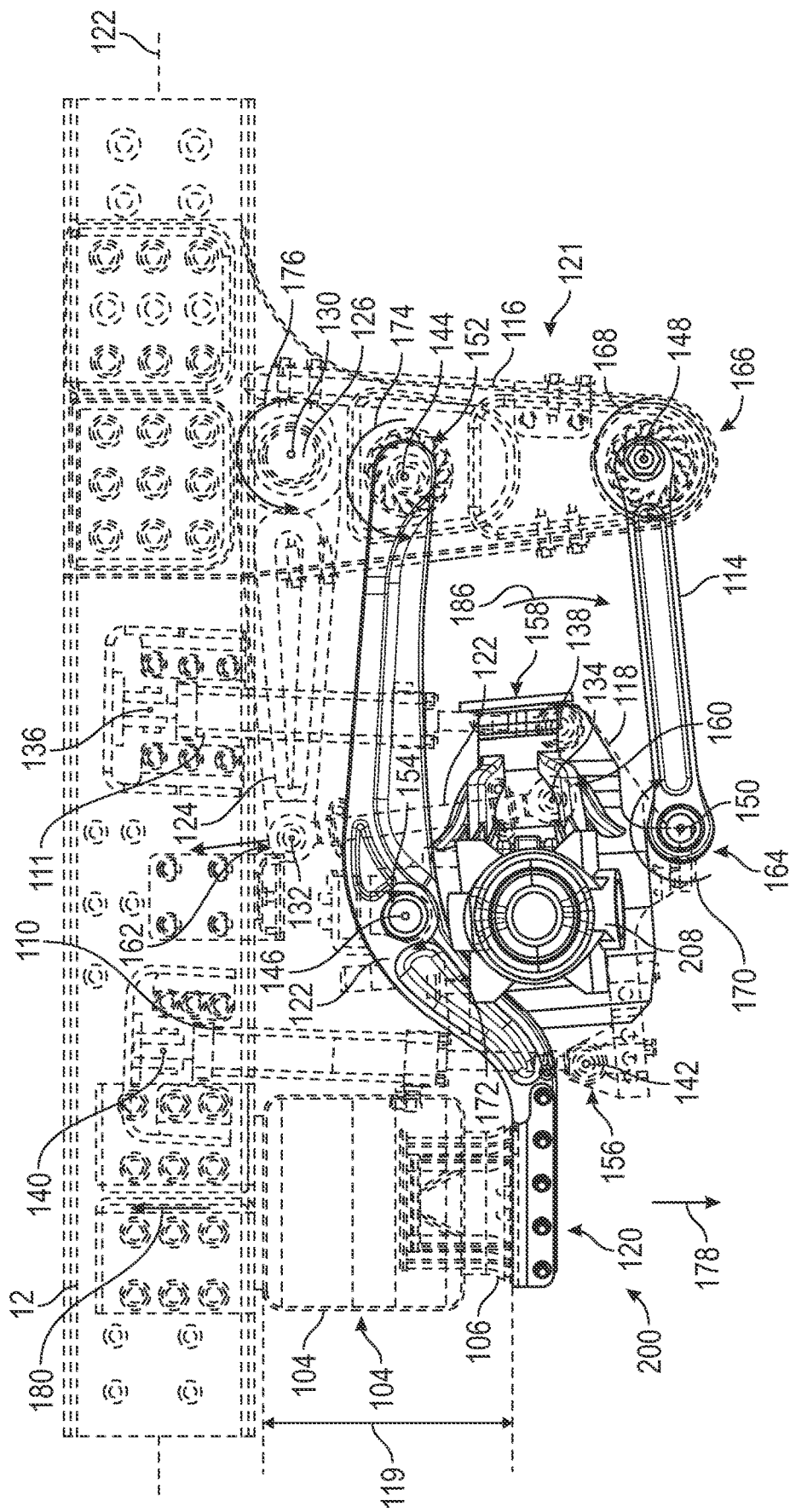
FIG. 7 is a side view of another one of the suspension assemblies of the commercial vehicle of FIG. 1, showing one of two four-bar linkages, according to an exemplary embodiment.
Figure 8:
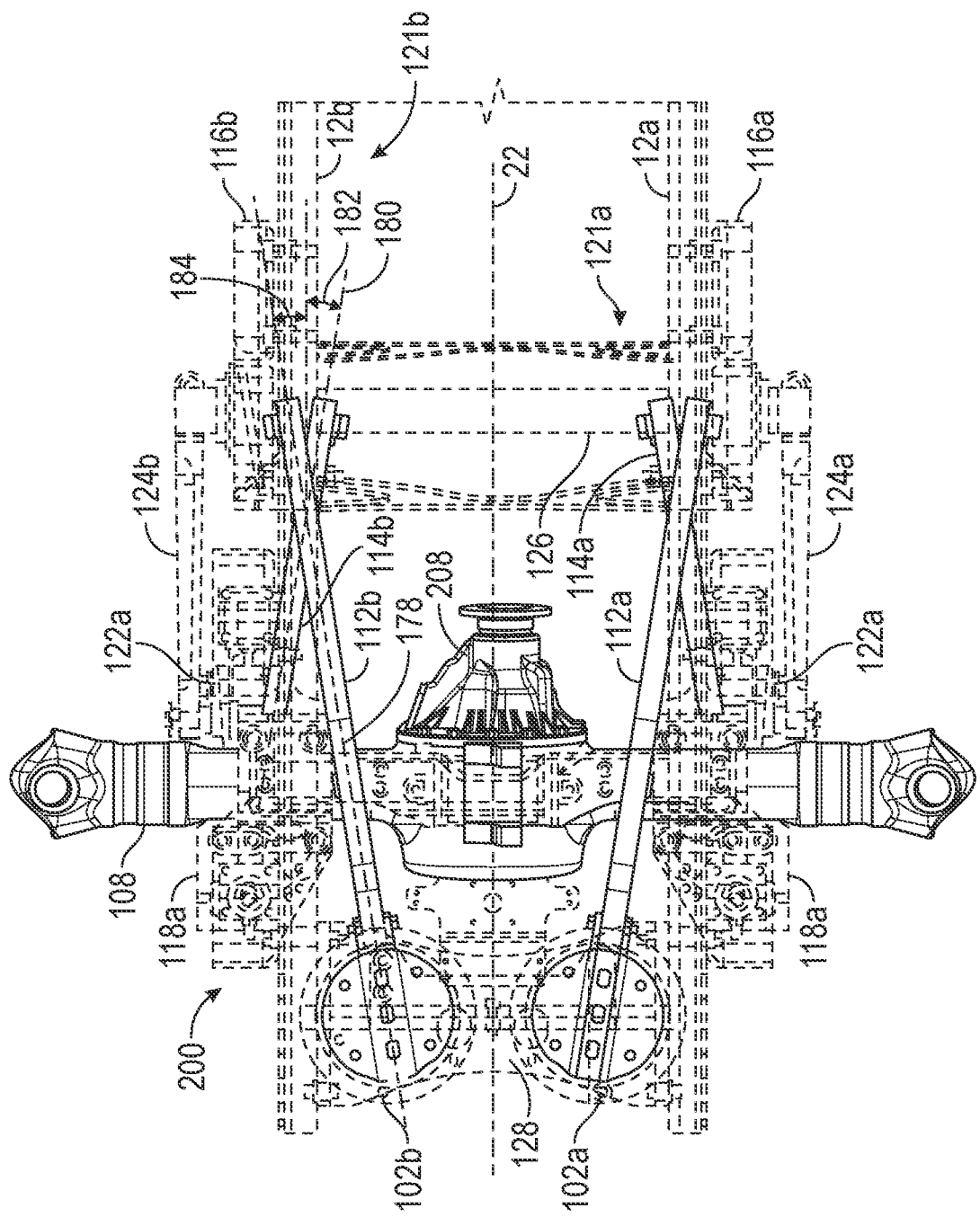
FIG. 8 is a top view of the suspension assembly of the commercial vehicle of FIG. 7, showing both of the two four-bar linkages, according to an exemplary embodiment.
Figure 9:
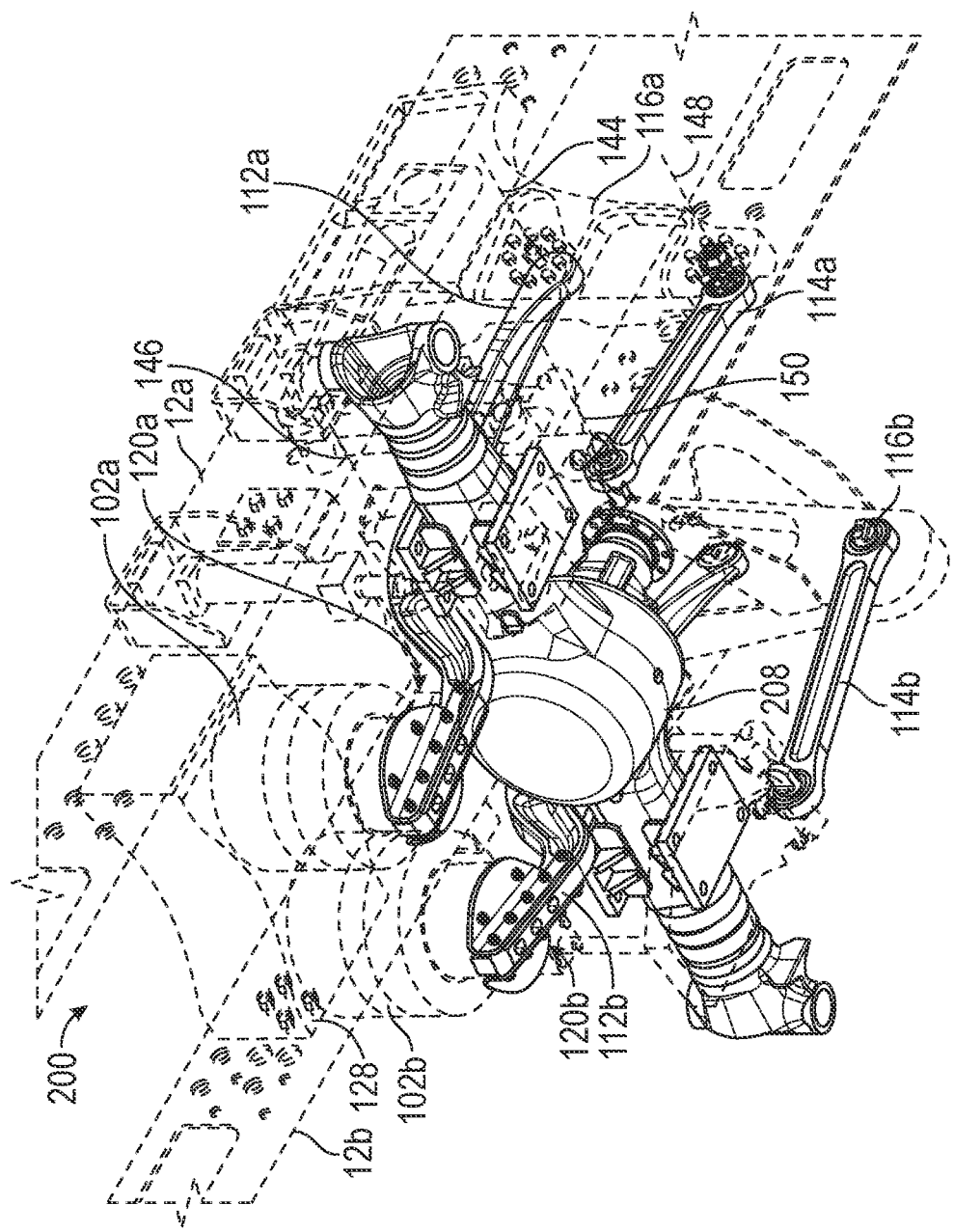
FIG. 9 is a perspective view of the suspension assembly of the commercial vehicle of FIG. 7, showing both of the two four-bar linkages, according to an exemplary embodiment.
Figure 10:
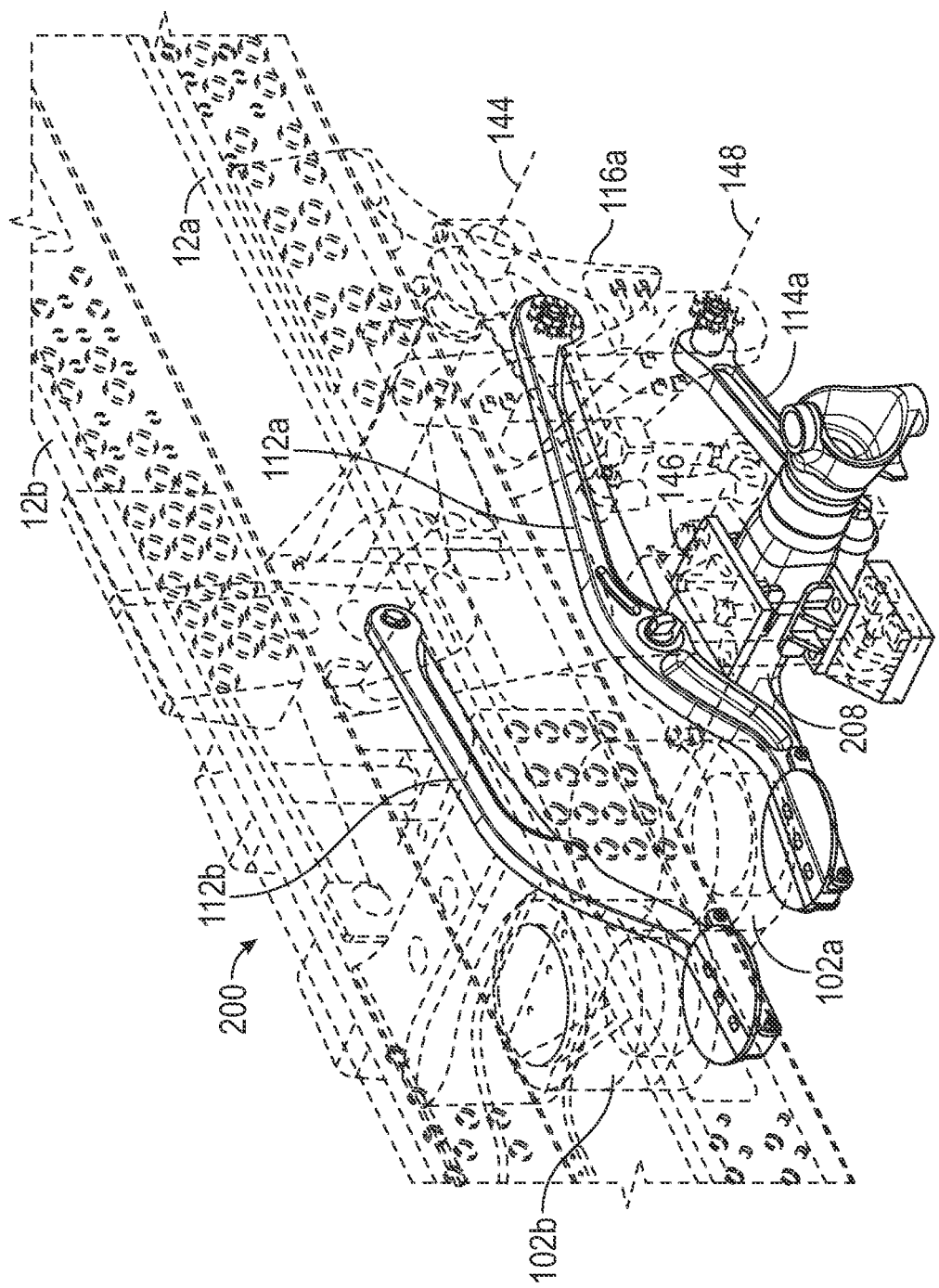
FIG. 10 is a perspective view of the suspension assembly of the commercial vehicle of FIG. 7, showing both of the two four-bar linkages, according to an exemplary embodiment.
Figure 11:
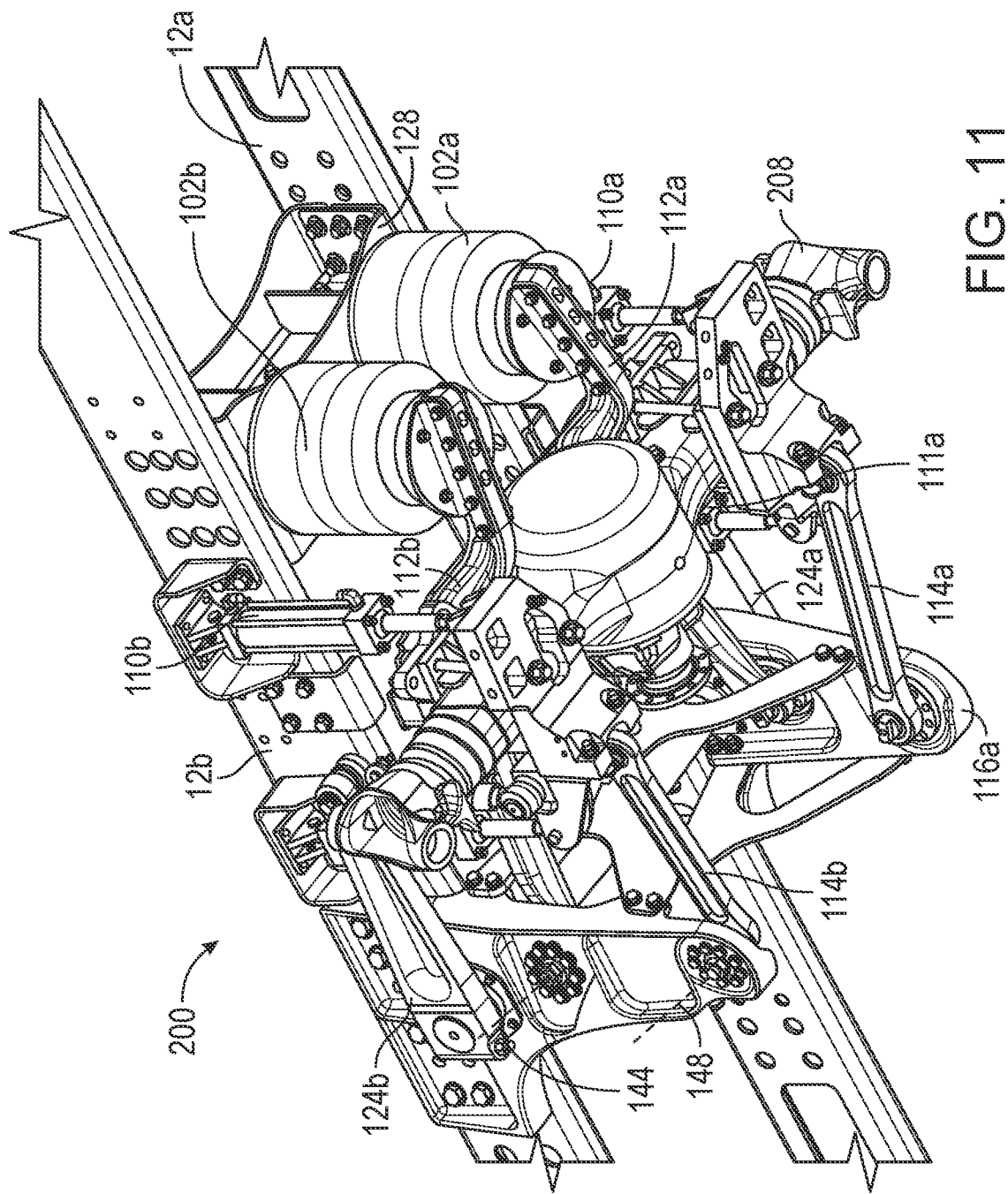
FIG. 11 is a perspective view of the suspension assembly of the commercial vehicle of FIG. 7, showing both of the two four-bar linkages, according to an exemplary embodiment.

Referring to FIGS. 7-11, the rear suspension assembly 200 is shown, according to an exemplary embodiment. The rear suspension assembly 200 may be the same as or similar to the front suspension assembly 100 including similar structure and elements as the front suspension assembly 100. The rear suspension assembly 200 can include the four bar linkage 121. However, the rear suspension assembly 200 includes a rear axle 208 in place of the front axle 108. The rear suspension assembly 200 may be a mirror or reverse image of the front suspension assembly 100 (e.g., along the longitudinal axis 22). As shown in FIGS. 2-12, the front suspension assembly 100 and the rear suspension assembly 200 are trailing arm suspension systems. Particularly, the direction of motion of the commercial vehicle 10 is to the right as shown in FIGS. 1, 2, and 7 so that the axes 130, 144, and 148 (e.g., pivot points) pass over bumps before the front axle 108 or the rear axle 208 pass over the bumps.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A commercial vehicle comprising:
   a frame extending in a longitudinal direction of the commercial vehicle and comprising a pair of rails spaced laterally apart;
   an axle;
   a suspension assembly coupled with the frame, the suspension assembly comprising:
      a pair of first linkages pivotally coupled at their first ends with a pair of structural members of the frame, the structural members extending in a downwards direction from the rails of the frame;
      a pair of air springs coupled with the frame and coupled with a second end of the first linkages, the air springs configured to extend and retract to drive the first linkages to pivot about their first ends relative to the structural members;
      a pair of carriages pivotally coupled with the first linkages at a position between the first end and the second end of the first linkages, the axle fixedly coupled with the carriages; and
      a pair of second linkages pivotally coupled at their first ends with the structural members, and pivotally coupled with the carriages at their second ends;
   wherein the pair of structural members, the pair of first linkages, the pair of second linkages, and the pair of carriages define a pair of four-bar linkages; and
   wherein the pair of first linkages extend in a direction non-parallel with a longitudinal axis of the commercial vehicle, the pair of first linkages extending inwards from their first ends where the first linkages pivotally couple with the structural members to their second ends where the first linkages couple with the air springs such that a lateral distance between the first ends of the pair of first linkages is greater than a lateral distance between the second ends of the pair of first linkages.

2. The commercial vehicle of claim 1, wherein operation of the air springs to pivot the first linkages about their first ends relative to the structural members drives the second linkages to also rotate about their first ends relative to the structural members.

3. The commercial vehicle of claim 1, wherein extension and retraction of the air springs drive the carriages and the axle to translate to adjust a ride height of the commercial vehicle.

4. The commercial vehicle of claim 1, wherein the pair of four-bar linkages are mirrored laterally across the longitudinal direction of the commercial vehicle.

5. The commercial vehicle of claim 1, wherein the pair of air springs are positioned between the rails of the frame.

6. The commercial vehicle of claim 1, wherein the first linkages both have an S-shape.

7. The commercial vehicle of claim 1, wherein the axle is either of a front axle or a rear axle and the suspension assembly is a trailing arm suspension assembly.

8. The commercial vehicle of claim 1, wherein the second linkages extend in an outwards direction from their first ends at which the second linkages pivotally couple with the structural members and their second ends at which the second linkages pivotally couple with the carriages.

9. The commercial vehicle of claim 8, wherein a lateral distance between the second ends of the pair of second linkages is greater than a lateral distance between the first ends of the pair of second linkages.

10. The commercial vehicle of claim 1, wherein the suspension assembly further comprises a shaft extending between the rails of the frame, wherein the shaft fixedly couples at either ends with the pair of carriages, wherein the shaft is configured to be loaded in torsion as the carriages.

11. The commercial vehicle of claim 10, wherein the shaft provides roll stiffness for the commercial vehicle.

12. A suspension assembly for a commercial vehicle comprising:
   a first linkage pivotally coupled at a first end with a structural member of a frame of the commercial vehicle, the structural member extending in a downwards direction from the frame;
   an air spring coupled with the frame and coupled with the second end of the first linkage, the air spring configured to extend and retract to drive the first linkage to pivot about the first end relative to the structural member;
   a carriage pivotally coupled with the first linkage at a position between the first end and the second end of the first linkage, an axle fixedly coupled with the carriage; and
   a second linkage pivotally coupled at a first end with the structural member, and pivotally coupled with the carriage at a second end;
   wherein the structural member, the first linkage, the second linkage, and the carriage define a four-bar linkage; and
   wherein the first linkage extends inwards from the first end where the first linkage pivotally couples with the structural member to the second end where the first linkage couples with the air spring such that the second end of the first linkage is laterally closer to a longitudinal centerline of the frame of the commercial vehicle than the first end of the first linkage.

13. The suspension assembly of claim 12, wherein operation of the air spring to pivot the first linkage about the first end relative to the structural member drives the second linkage to also rotate about the first end relative to the structural member.

14. The suspension assembly of claim 12, wherein extension and retraction of the air spring drives the carriage and the axle to translate to adjust a ride height of the commercial vehicle.

15. The suspension assembly of claim 12, wherein the air spring is positioned between rails of the frame.

16. The suspension assembly of claim 12, wherein the first linkage has an S-shape.

17. The suspension assembly of claim 12, wherein the suspension assembly is a trailing arm suspension assembly.

18. The commercial vehicle of claim 12, wherein the second linkage extends in an outwards direction from the first end at which the second linkage pivotally couples with the structural member and the second end at which the second linkage pivotally couples with the carriage such that the second end of the second linkage is laterally further away from the longitudinal centerline of the frame of the commercial vehicle than the first end of the second linkage.

19. A chassis for a commercial vehicle, the chassis comprising:
   an axle;
   a suspension assembly coupled with a frame of the commercial vehicle, the suspension assembly comprising:
      a pair of first linkages pivotally coupled at their first ends with a pair of structural members of the frame, the structural members extending in a downwards direction from rails of the frame;
      a pair of air springs coupled with the frame and coupled with a second end of the first linkages, the air springs configured to extend and retract to drive the first linkages to pivot about their first ends relative to the structural members;
      a pair of carriages pivotally coupled with the first linkages at a position between the first end and the second end of the first linkages, the axle fixedly coupled with the carriages; and
      a pair of second linkages pivotally coupled at their first ends with the structural members, and pivotally coupled with the carriages at their second ends;
   wherein the pair of structural members, the pair of first linkages, the pair of second linkages, and the pair of carriages define a pair of four-bar linkages; and
   wherein the pair of first linkages extend in a direction non-parallel with a longitudinal axis of the commercial vehicle, the pair of first linkages extending inwards from their first ends where the first linkages pivotally couple with the structural members to their second ends where the first linkages couple with the air springs such that a lateral distance between the first ends of the pair of first linkages is greater than a lateral distance between the second ends of the pair of first linkages.

20. The commercial vehicle of claim 19, wherein a lateral distance between the second ends of the pair of second linkages is greater than a lateral distance between the first ends of the pair of second linkages.

* * * * *